United States Patent
Li et al.

(10) Patent No.: US 9,147,095 B2
(45) Date of Patent: Sep. 29, 2015

(54) OPTICAL CODE SCANNER OPTIMIZED FOR READING 2D OPTICAL CODES

(71) Applicants: Jun Li, Marietta, GA (US); Sik Piu Kwan, Suwanee, GA (US)

(72) Inventors: Jun Li, Marietta, GA (US); Sik Piu Kwan, Suwanee, GA (US)

(73) Assignee: NCR Corporation, Duluth, GA (US)

( * ) Notice: Subject to any disclaimer, the term of this patent is extended or adjusted under 35 U.S.C. 154(b) by 18 days.

(21) Appl. No.: 14/087,198

(22) Filed: Nov. 22, 2013

(65) Prior Publication Data

US 2015/0144693 A1 May 28, 2015

(51) Int. Cl.
*G06K 7/10* (2006.01)
*G06K 7/14* (2006.01)

(52) U.S. Cl.
CPC .......... *G06K 7/10722* (2013.01); *G06K 7/1443* (2013.01); *G06K 7/1465* (2013.01); *G06K 7/1473* (2013.01)

(58) Field of Classification Search
CPC . G06K 7/1443; G06K 7/1417; G06K 7/1456; G06K 19/06028; G06K 9/36; G06K 7/10722; G06K 7/1465; G06K 7/1473; G06T 3/4007; G06T 3/4069
USPC .......... 235/437, 462.08, 462.09, 454
See application file for complete search history.

(56) References Cited

U.S. PATENT DOCUMENTS

| | | | | |
|---|---|---|---|---|
| 4,948,955 A | * | 8/1990 | Lee et al. | 235/462.08 |
| 5,120,940 A | * | 6/1992 | Willsie | 235/462.08 |
| 5,487,115 A | * | 1/1996 | Surka | 382/296 |
| 6,565,003 B1 | * | 5/2003 | Ma | 235/462.1 |
| 6,758,399 B1 | * | 7/2004 | Brunelli et al. | 235/462.01 |
| 8,150,163 B2 | * | 4/2012 | Kruppa | 382/190 |
| 8,186,594 B2 | * | 5/2012 | Uzawa et al. | 235/462.09 |
| 2001/0055422 A1 | * | 12/2001 | Roustaei | 382/181 |
| 2004/0099741 A1 | * | 5/2004 | Dorai et al. | 235/462.08 |
| 2006/0011724 A1 | * | 1/2006 | Joseph et al. | 235/454 |
| 2006/0202040 A1 | * | 9/2006 | Wang et al. | 235/462.27 |
| 2006/0269136 A1 | * | 11/2006 | Squires et al. | 382/181 |
| 2007/0194118 A1 | * | 8/2007 | Powell et al. | 235/454 |
| 2007/0257934 A1 | * | 11/2007 | Doermann et al. | 345/606 |
| 2008/0029602 A1 | * | 2/2008 | Burian et al. | 235/462.09 |
| 2008/0296393 A1 | * | 12/2008 | Jovanovski et al. | 235/472.01 |
| 2008/0310765 A1 | * | 12/2008 | Reichenbach et al. | 382/312 |

(Continued)

OTHER PUBLICATIONS

Singh et al., "Comparative Study on Thresholding," Int'l. Journal of Instrumentation, Control and Automation, vol. 1, Issue 1 (2011) (retrieved from interscience.in/IJICA_Vol1_Iss1/paper_14.pdf on Jan. 28, 2015).*

(Continued)

*Primary Examiner* — Thien M Le
*Assistant Examiner* — Claude J Brown
(74) *Attorney, Agent, or Firm* — Harden E. Stevens, III; Andrew J. Thomson (57) ABSTRACT

An optical code scanner is presented that includes image capture technology to read optical codes. The optical code scanner captures an image of an optical code and then generates multiple reduced resolution versions of the image. Multiple techniques are applied to the different images to identify a region of interest, enhance the contrast of the image, perform a non-linear local geometrical distortion correction and minimize the spatial resolution required to read the optical code. The techniques reduce the raw processing power and time required to identify and read an optical code.

19 Claims, 5 Drawing Sheets

(56) References Cited

U.S. PATENT DOCUMENTS

| | | | |
|---|---|---|---|
| 2009/0218404 A1* | 9/2009 | Zhang et al. | 235/462.41 |
| 2010/0020970 A1* | 1/2010 | Liu et al. | 380/255 |
| 2010/0044439 A1* | 2/2010 | Lee | 235/462.08 |
| 2010/0048242 A1* | 2/2010 | Rhoads et al. | 455/556.1 |
| 2010/0163632 A1* | 7/2010 | Tseng et al. | 235/494 |
| 2010/0264219 A1* | 10/2010 | He et al. | 235/454 |
| 2012/0091206 A1* | 4/2012 | Goren | 235/470 |
| 2013/0140365 A1* | 6/2013 | Canini et al. | 235/454 |

OTHER PUBLICATIONS

Adelson et al., "Pyramid methods in image processing," RCA Engineer vol. 29, No. 6 (Nov./Dec. 1984) (retrieved from http://web.mit.edu/persci/people/adelson/pub_pdfs/RCA84.pdf on Jan. 29, 2015).*

* cited by examiner

OPTICAL CODE SCANNER OPTIMIZED FOR READING 2D OPTICAL CODES

FIELD OF THE INVENTION

The present invention relates to optical code scanners and more specifically to optical code scanners optimized for reading two dimensional optical codes.

BACKGROUND

Optical code scanners are used to read optical codes and the information encoded therein. Optical code scanners may suitably be combined with other apparatuses or systems that use optical codes. For example, an optical code scanner can be integrated with a point of sale (POS) terminal to read optical codes on items which are presented to the POS terminal for purchase as part of a purchase transaction.

There are a number of different optical formats that can be employed by an optical code to encode machine readable information that can then be read by an optical code scanner. Each optical format has an associated set of rules and optical patterns and elements that are used to represent encoded data. Some optical formats are classified as two dimensional (2D) because the optical formats encode information in two different physical directions or dimensions. 2D optical codes present a number of issues that must be addressed before the 2D optical codes can be read by an optical code scanner.

One issue relates to non-uniform illumination of an optical code as it is presented to the optical code scanner for scanning. Non-uniform illumination causes areas of an optical code to be lighter or darker than other areas of the optical code. This results in unpredictable contrast variations across the optical code which makes distinguishing the elements of the optical code extremely difficult.

Another issue relates to non-linear geometrical distortion of an optical code. Geometrical distortion is a discrepancy between the horizontal and vertical dimensions of an image. Geometrical distortion can cause a circle to appear as an oval or distort the relationship of adjacent elements of an optical code causing the elements to be misread.

Another issue relates to the amount of hardware based computing power that can be required to process a captured megapixel image to read an optical code within a specified period of time. An image based optical code scanner must be able to process a minimal number of images per second or it will slow down downstream processes that require the data from the scanned optical codes. To meet these requirements, optical code scanners have used specialized hardware acceleration devices to process the images so that the minimal number of images per second can be met. However, hardware acceleration devices are expensive and are not available in some devices, such as personal computers, cellular phones, tablet computers and hand held scanners.

SUMMARY

Among its several aspects, the present invention seeks to overcome or ameliorate at least one of the disadvantages of the prior art, or to provide a useful alternative.

Among its several aspects, the present invention recognizes that there is an advantage to using image scanning technology to scan and decode optical codes because the technology can read a wide variety of different optical code types such as one dimensional and two dimensional bar codes. The invention further recognizes that the image scanning technology of this invention has the advantage of rapidly indentifying optical codes using the available standard processing power with no specialized image processing hardware.

The invention further recognizes the performance benefits of performing the steps of optical code identification on reduced resolution images generated from a captured high resolution image. Additional performance improvements are realized by performing certain image enhancement functions on the reduced resolution images instead of on the high resolution captured image.

The invention recognizes the performance benefits of limiting the operating area of image enhancement functions used to recover optical code data to a region of interest in the captured high resolution image that has, by analysis of the lower resolution generated images, been determined to include an optical code candidate.

In accordance with an embodiment of the present invention, there is provided a method of operating an optical code scanner that increases the item scanning performance without requiring specialized or additional processor power. The method is implemented by a digital processor located within the optical code scanner. The method comprises: capturing an image from the item scanning area of the optical code scanner; generating a sequence of reduced resolution images from the captured image wherein each successive generated image has a lower resolution than the prior image; enhancing the contrast of the lowest resolution generated image not previously enhanced to improve the quality of the image; identifying a region of interest in the enhanced generated image with the highest resolution wherein the region of interest includes an optical code candidate; modifying a portion of the captured image that corresponds to the identified region of interest to correct for geometrical distortion; and recovering optical code data from the optical code candidate located in the modified portion of the captured image.

In accordance with another embodiment of the present invention, there is provided a method of operating an optical code scanner that increases the item scanning performance without requiring specialized or additional processor power. The method is implemented by a digital processor located within the optical code scanner. The method comprises: capturing an image from the item scanning area of the optical code scanner; generating a sequence of reduced resolution images from the captured image wherein each successive generated image has a lower resolution than the prior image; enhancing the contrast of the lowest resolution generated image not previously enhanced to improve the quality of the image; examining the highest resolution generated image that has been enhanced to determine if a region of interest exists wherein the region of interest includes an optical code candidate and when a region of interest is determined not to exist, repeating the enhancing and examining steps until a region of interest is found or all enhanced generated images have been examined and when a region of interest is determined to exist, performing the modifying and recovering steps; determining when no region of interest has been found to exist and all enhanced generated images have been examined for a region of interest and then repeating the capturing, the generating, the enhancing and examining steps; modifying a portion of the captured image that corresponds to the identified region of interest to correct for geometrical distortion; and recovering optical code data from the optical code candidate located in the modified portion of the captured image.

In accordance with an embodiment of the present invention, there is provided an optical code scanner optimized to read two dimensional bar codes without the need for additional or specialized processors. The optical code scanner comprises: an image capture device arranged to receive images from an item scanning area of the optical code scanner; a communications device connected to an external network; a memory including software; and a processor in communication with the image capture device, the communications device and the memory and where the software when executed by the processor causes the processor to perform the following steps: capture an image from the item scanning area of the optical code scanner; generate a sequence of reduced resolution images from the captured image wherein each successive generated image has a lower resolution than the prior image; enhance the contrast of the lowest resolution generated image not previously enhanced to improve the quality of the image; identify a region of interest in the enhanced generated image with the highest resolution wherein the region of interest includes an optical code candidate; modify a portion of the captured image that corresponds to the identified region of interest to correct for geometrical distortion; and recover optical code data from the optical code candidate located in the modified portion of the captured image.

A more complete understanding of the present invention, as well as further features and advantages of the invention, will be apparent from the following Detailed Description and the accompanying Drawings.

BRIEF DESCRIPTION OF THE DRAWINGS

The present invention may take form in various components and arrangement of components and in various methods. The drawings are for purposes of illustrating example embodiments and alternatives and are not to be construed as limiting the invention. The drawings are not necessarily drawn to scale. Throughout the drawings, like element numbers are used to describe the same parts throughout the various drawings, figures and charts.

DETAILED DESCRIPTION

In the following description, numerous details are set forth to provide an understanding of the claimed invention. However, it will be understood by those skilled in the art that aspects of the claimed invention may be practiced without utilizing all of these details and that numerous variations or modifications from the described embodiments are possible and envisioned.

Figure 1:
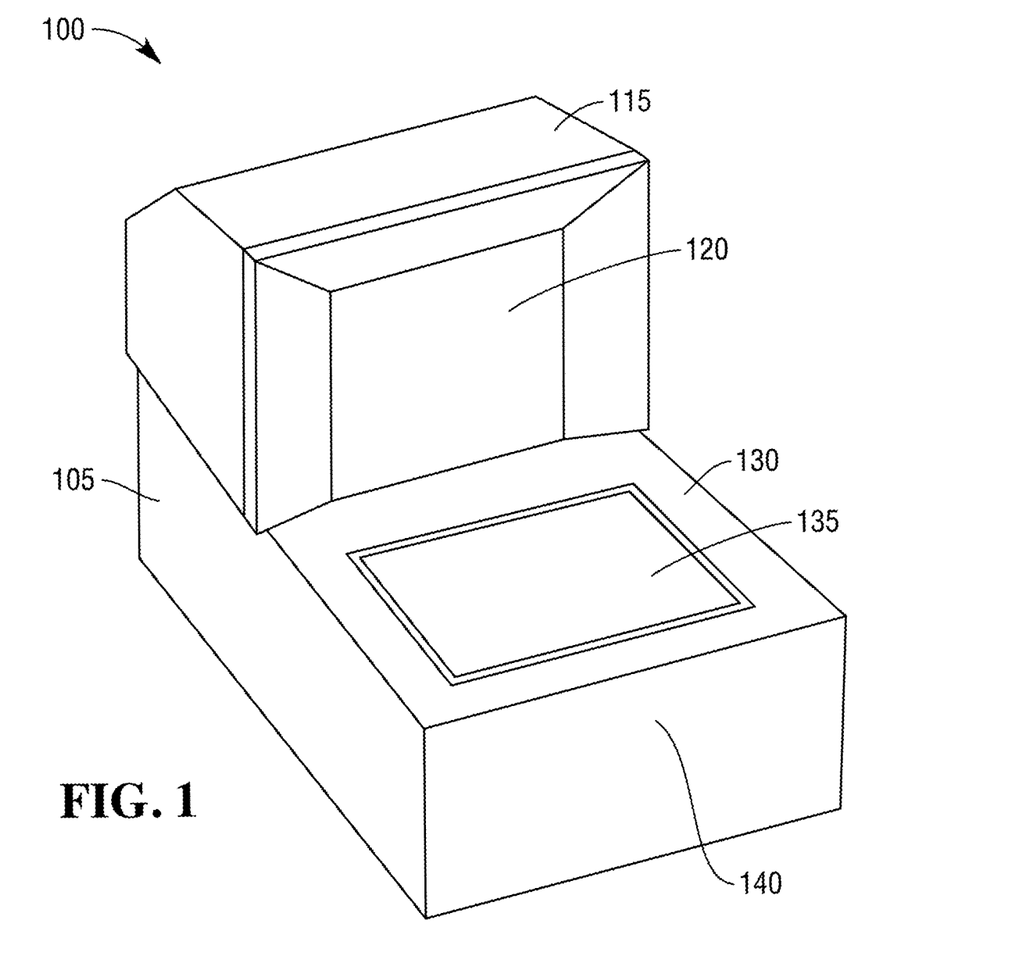
FIG. 1 is a high-level drawing illustrating an optical code scanner of the present invention.

Referring to FIG. 1, there is provided a high-level drawing illustrating an exemplar embodiment of an optical code scanner ("scanner") 100. The optical code scanner 100 reads optical codes presented to the optical code scanner 100. An optical code is a computer readable representation of information. Optical codes can be attached to or printed on an item or object or displayed on an electronic display, such as the display screen of a cell phone or tablet computer. The optical code may suitably include one dimensional and two dimensional bar codes. The optical code scanner 100 can read optical codes based on symbologies that include but are not limited to: PDF417, UPS, EAN, Code 128, GS1 DataBar™, Data Matrix, Aztec, QR and MaxiCode.

The scanner 100 is located within a housing 105. The housing 105 includes a vertical housing component 115 and a horizontal housing component 130. The scanner 100 includes a horizontal scanning window 135 and a vertical scanning window 120. The horizontal scanning window 135 is housed in the horizontal housing component 130. The vertical scanning window 120 is housed in the vertical housing component 115 of the scanner 100 and faces an operator side 140 of the scanner 100. The side of the vertical housing component 115 that houses the vertical scanning window 120 is the front of the scanner 100 and faces the operator of the scanner 100. The two scanning windows 120, 135 are composed of an optically transparent material such as hurricane glass, sapphire coated glass or the like.

An operator scans an item by orienting an optical code on an item or device so it faces either the vertical scanning window 120 or the horizontal scanning window 135 and then moving the item past the scanning windows 120, 135. The scanner 100 produces one or more indications to the operator, such as an audio sound, a light or both, once the optical code has been identified and read. The scanner 100 uses imaging technology to capture images of the optical code which are processed to decode the information stored in the optical code.

In this embodiment, the scanner 100 is illustrated using two scanning windows 120, 135. In other embodiments, a single scanning window or three or more scanning windows are used to implement the scanner 100. The scanner 100 is fixed to a location when in operation. However, a mobile or hand held scanner implementing the invention is also envisioned.

In some embodiments, the scanner 100 is part of a self-service checkout terminal where the operator would generally be a customer that is scanning items for purchase. In other embodiments, the scanner 100 is part of an assisted checkout terminal where the operator is generally an employee that is trained to operate the terminal and conduct a purchase transaction for a customer. In some embodiments, the scanner 100 is part of a terminal that can be configured to at times be a self-service checkout terminal and at other times be an assisted checkout terminal. In still other embodiments, the scanner 100 is part of a system where the scanner 100 is used to identify items that pass by the scanner 100. An operator may still scan the items or the items may be automatically moved past the scanner 100 on a conveyor belt or the like. Examples of these types of systems include but are not limited to: inventory management systems, item routing systems, item sorting systems, mail or package sorting systems and the like.

In some embodiments, the scanner 100 may suitably include additional laser scanning technology that uses one or more lasers to scan and read an optical code. The laser beams from the laser are directed to form scanning patterns through the vertical scanning window 120 and the horizontal scanning window 135. When a directed laser beam strikes and moves across an object presented to the scanner 100 for scanning, the object reflects a portion of the laser light. Some of the reflected laser light passes back through one of the scanning windows (120 or 135) and is directed to a photodetector that produces electrical signal data proportional to the intensity of the received light. The electrical signal data is processed to detect the presence of an optical code and to recover the information encoded on the optical code.

Figure 2:
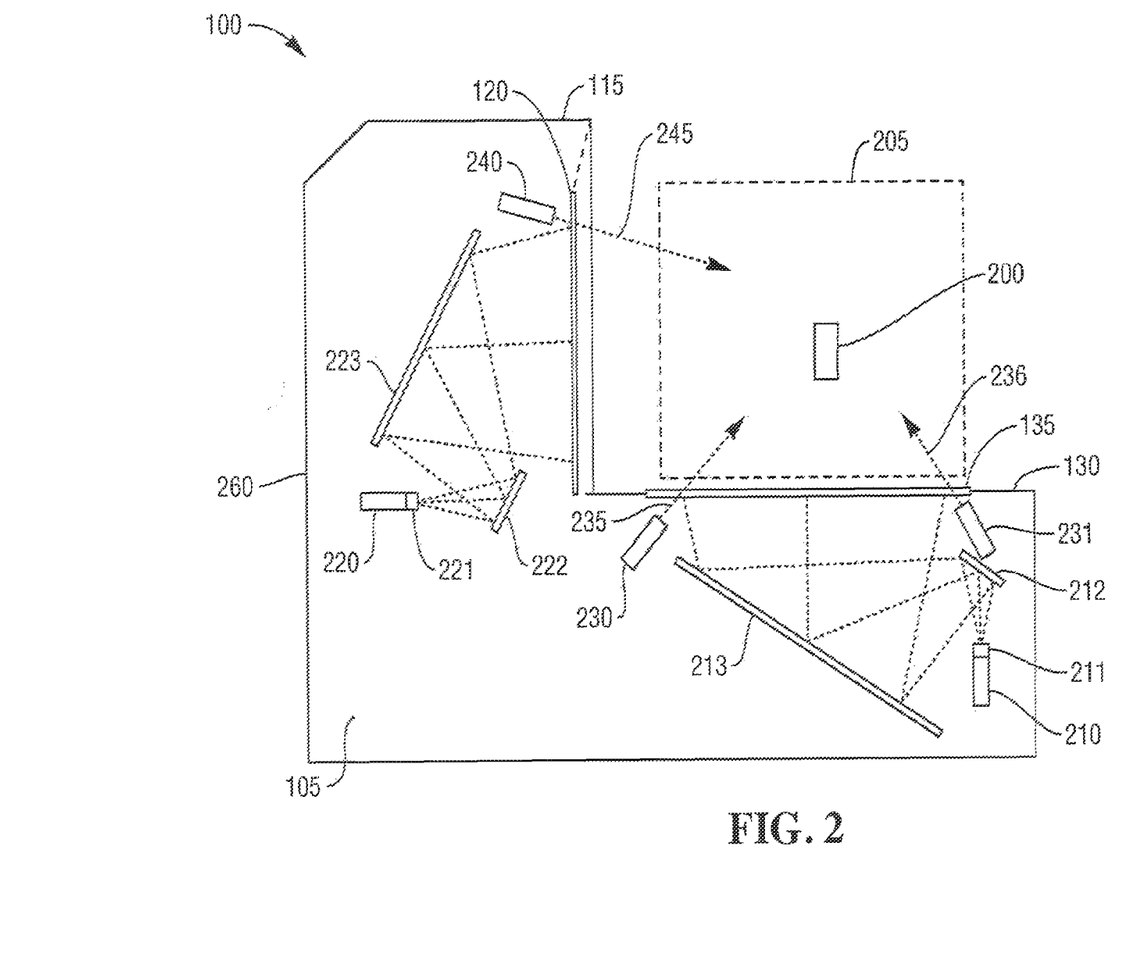
FIG. 2 is a high-level cross-sectional drawing illustrating the optical code scanner.

Referring now to FIG. 2, there is provided a high-level cross-sectional drawing further illustrating the exemplar embodiment of the optical code scanner 100. The scanner 100 includes a first image capture device 210 and a second image capture device 220. The first image capture device 210 includes a first optical assembly 211 that focuses light directed at the first image capture device 210 onto the first image capture device 210. The second image capture device 220 also includes a second optical assembly 221 that focuses light directed at the second image capture device 220.

The first image capture device 210 captures images that pass through the horizontal scanning window 135 and are reflected by a first mirror 213 to a second mirror 212 and then through the first optical assembly 211 to the first image capture device 210 where the images are captured as digital images. A first illumination device 230 and a second illumination device 231 are positioned below the horizontal scanning window 135. Each illumination device 230, 231 generates light 235, 236 that passes through the horizontal scanning window 135 and illuminates an object 200 located in an object scanning area 205. The object scanning area 205 is located above the horizontal scanning window 135 and in front of the vertical scanning window 120. The scanner 100 is designed so that optical codes located within the object scanning area 205 can be read by processing captured images of the optical codes. The object 200 includes an optical code that is read by the scanner 100.

The second image capture device 220 captures images that pass through the vertical scanning window 120 and are reflected by a third mirror 223 to a fourth mirror 222 and then through the second optical assembly 221 to the second image capture device 220 where they are captured as digital images. A third illumination device 240 is positioned behind the vertical scanning window 120. The third illumination device 240 generates light 245 that passes through the vertical scanning window 120 and also illuminates the object 200 located in the object scanning area 205.

Each of the illumination devices 230, 231, 240 may suitably include a separate red, green and blue light emitting diode (LED). Each of the LEDs can be controlled separately to create a wide range of colors. In some embodiments, the three LEDs are combined into a single LED that can produce red, green and blue light. When just the red LED is turned on, a narrow band of red light is emitted where the wavelength is in the range of 620-645 nanometers. When just the green LED is turned on, a narrow band of green light is emitted where the wavelength is in the range of 520-550 nanometers. When just the blue LED is turned on, a narrow band of blue light is emitted where the wavelength is in the range of 460-490 nanometers. The present invention will still function if the light emitted by an LED is slightly outside of these ranges.

In other embodiments, there are more than three illumination devices and they are positioned around the scanning windows 135, 120. Some may suitably be located within the housing 105 such that they transmit light through an opening in the housing 105 other than through one of the scanning windows 135, 120. Further, each of the illumination devices 230, 231, 240 may suitably include multiple illumination devices that are aimed in slightly different directions to illuminate a wider area. Each of the illumination devices 230, 231, 240 are controlled by a processor 310 shown in FIG. 3.

In still other embodiments, each scanning window 135, 120 has more than a single image capture device. The additional image capture device or devices capture images from different areas of the object scanning area 205.

In some embodiments, the horizontal scanning window 135 is incorporated in a weigh plate (not shown) that is attached to a weigh scale 335 (FIG. 3) which determines the weight of objects placed on the weigh plate or the horizontal scanning window 135.

The two image capture devices 210, 220 preferably may be implemented using image sensors that are based on complementary metal oxide semiconductor (CMOS) technology. In some embodiments, other types of image sensor technology are used such as charged-coupled device (CCD) technology. Each of the image capture devices 210, 220 captures an electronic image of an optical image directed to the device. The electronic image is captured in the form of digital image data that represents the intensity of light received by each pixel of each image capture device 210, 220.

Figure 3:
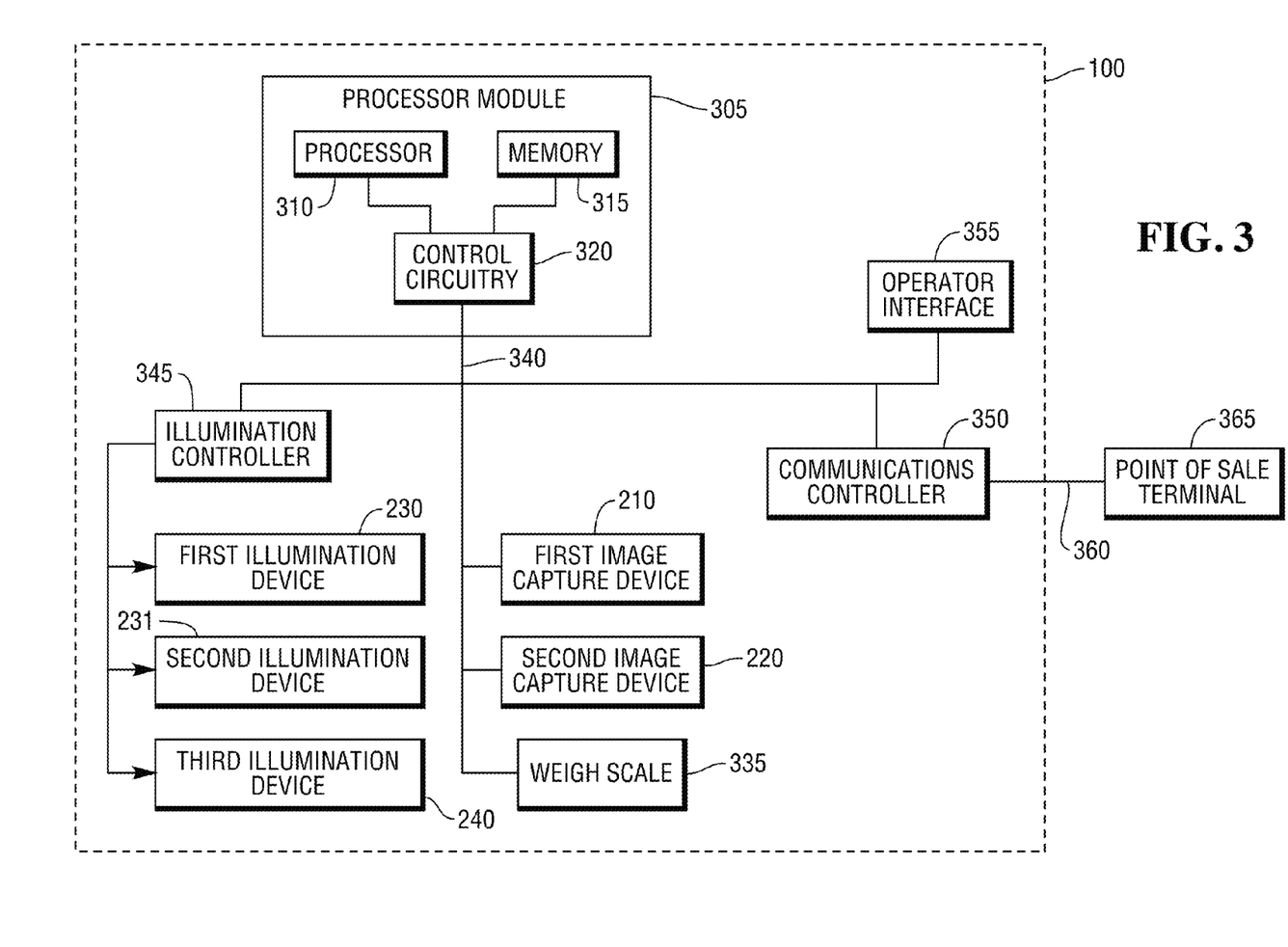
FIG. 3 is a high-level block diagram illustrating selected hardware components of the optical code scanner.

With reference to FIG. 3, there is provided a high-level block diagram illustrating an exemplar embodiment of certain hardware components of the scanner 100. The scanner 100 includes a processor module 305 that includes a processor 310, a memory 315, and control circuitry 320. The memory 315 is non-transitory and computer readable. The memory 315 includes both volatile and non-volatile memory. The non-volatile memory may suitably include solid state and/or rotating memory devices. The processor 310 executes computer instructions, embodied as software, stored in the memory 315 which when executed by the processor 310 cause the processor 310 to control the components of the scanner 100 and to implement the features and functions of the scanner 100.

The control circuitry 320 includes hardware interfaces between the processor 310 and the memory 315 and between the processor 310 and a bus 340 used to communicate with other components of the scanner 100. The scanner 100 further includes an illumination controller 345, an operator interface 355 and a communications controller 350. The bus 340 connects the processor 310 to the first image capture device 210, the second image capture device 220, the weigh scale 335, the operator interface 355 and the communications controller 350 such that the processor 310 can communicate with and control each of them.

The illumination controller 345 controls the three illumination devices 230, 231, 240. The processor 310 causes the illumination controller 345 to control each of the illumination devices 230, 231, 240. Controlling the illumination devices 230, 231, 240 includes turning the illumination devices 230, 231, 240 on or off, setting the color of light that is generated and setting the output power. The illumination devices 230, 231, 240 are turned on for short periods of time and during each period they are instructed to generate one color of light. The illumination devices 230, 231, 240 can generate a large number of light colors.

The communications controller 350 includes the hardware and software required for the scanner 100 to connect to and communicate over an external network 360 to a point of sale terminal 365. In some embodiments, the network 360 is implemented as a universal system bus (USB). In other embodiments, the network 360 is implemented as an RS-232 interface. In other embodiments, the scanner 100 communicates over the network 360 to different types of apparatuses or systems.

The operator interface 355 includes input devices, such as buttons and an output device such as one or more LEDs associated with the different functions and a speaker that produces audible sounds associated with different functions all of which are used to communicate information to the operator.

The present invention uses multi-resolution image analysis methods to first find optical code candidates and then decode the optical code. The lowest resolution image is used to identify a region of interest (ROI) that includes an optical code candidate and then a higher resolution image is used to read the optical code. The methods disclosed herein are described as operating on images captured by the first image capture device 210, but the methods apply equally to images captured by the second image capture device 220. Other embodiments may include additional image capture devices and the methods described herein also apply to images captured by the additional image capture devices if the devices are being used to capture images of optical codes.

Figure 4:
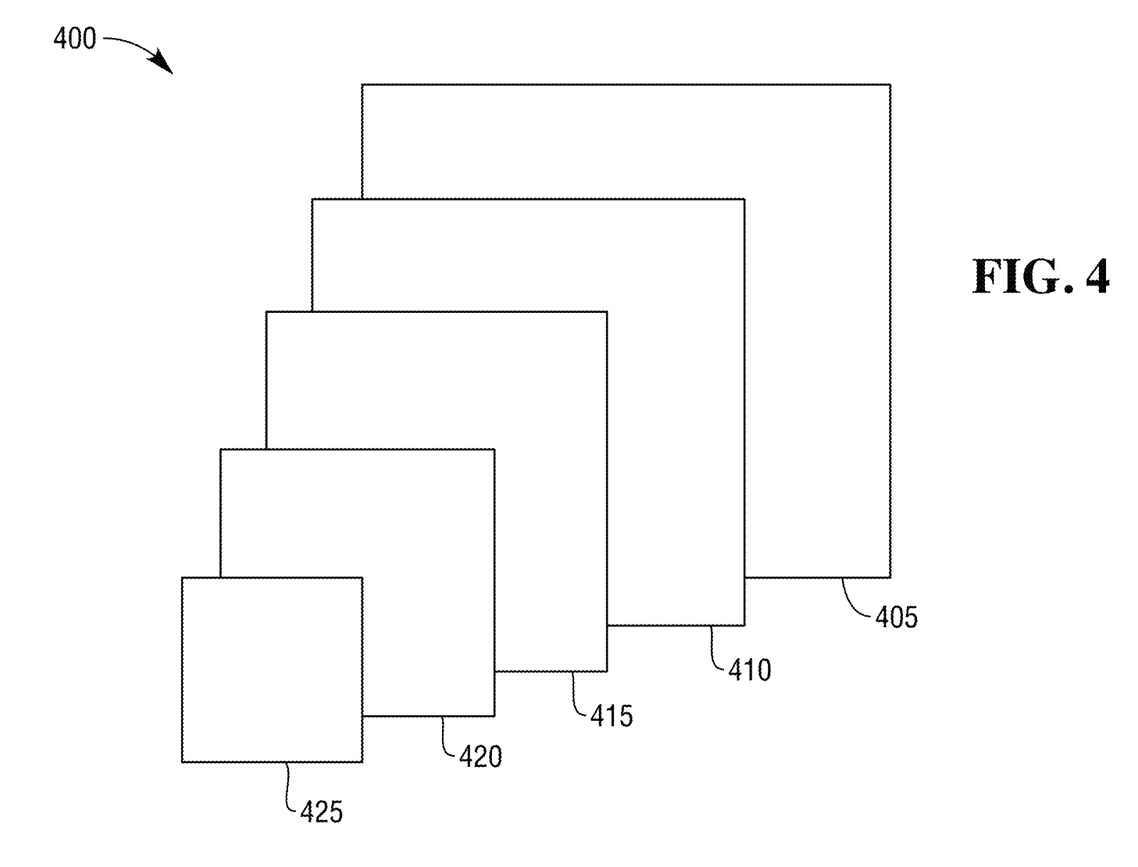
FIG. 4 is a high-level visual representation of five image layers used to store captured and generated image data.

Turning now to FIG. 4, there is provided a visual representation of five image layers 405, 410, 415, 420, 425 that are used to store elements of a captured image. The captured image is captured by the first image capture device 210 and includes an image of the optical code 200. Each of the image layers includes image data that represents all or a portion of the captured image. The processor 310 assigns a portion of the memory 315 for each of the image layers.

The first image layer 405 is used to store the raw image data for the original captured image. The pixel resolution for the original captured image is 1280 (col.)×960 (rows) or 1.2 megapixels. In other embodiments, the resolution of captured images is higher. The second image layer 410 is a reduced resolution version of the captured image and is generated by the processor 315 using the image data from the first image layer 405. The modified image stored in the second image layer 410 has a pixel resolution of 640×480 or approximately 307K pixels. The third image layer 415 is a reduced resolution version of the image stored in the second image layer 410 and is generated by the processor 315 using the image data from the second image layer 410. The modified image stored in the third image layer 415 has a pixel resolution of 320×240 or approximately 77K pixels. The forth image layer 420 is a reduced resolution version of the image stored in the third image layer 415 and is generated by the processor 315 using the image data from the third image layer 415. The modified image stored in the forth image layer 420 has a pixel resolution of 160×120 or approximately 19K pixels. Finally, the fifth image layer 425 is a reduced resolution version of the image stored in the forth image layer 420 and is generated by the processor 315 using the image data from the forth image layer 420. The modified image stored in the fifth image layer 425 has a pixel resolution of 80×60 or approximately 5K pixels.

There are a number of methods that can be used to reduce the resolution of a digital image. The present invention uses pixel binning to produce each of the reduced resolution image layers 410, 415, 420, 425. Pixel binning combines image data from a group of pixels into a single pixel. For example, a 2×2 block of pixels can be combined and replaced by a single pixel which provides a 4 to 1 reduction in the amount of image data. One feature of reducing the resolution of the captured image is that each reduction reduces image noise making it easier to detect features of interest in the image.

In other embodiments, bilinear interpolation is a method used to reduce the resolution of the digital image. Bilinear interpolation is used when the number of pixels to be reduced to a single pixel is not a whole number. For example, a block of pixels that measured 2.4×2.4 pixels does not represent a whole number of pixels and the bilinear interpolation method is used to reduce the block down to a single pixel.

Figure 5:
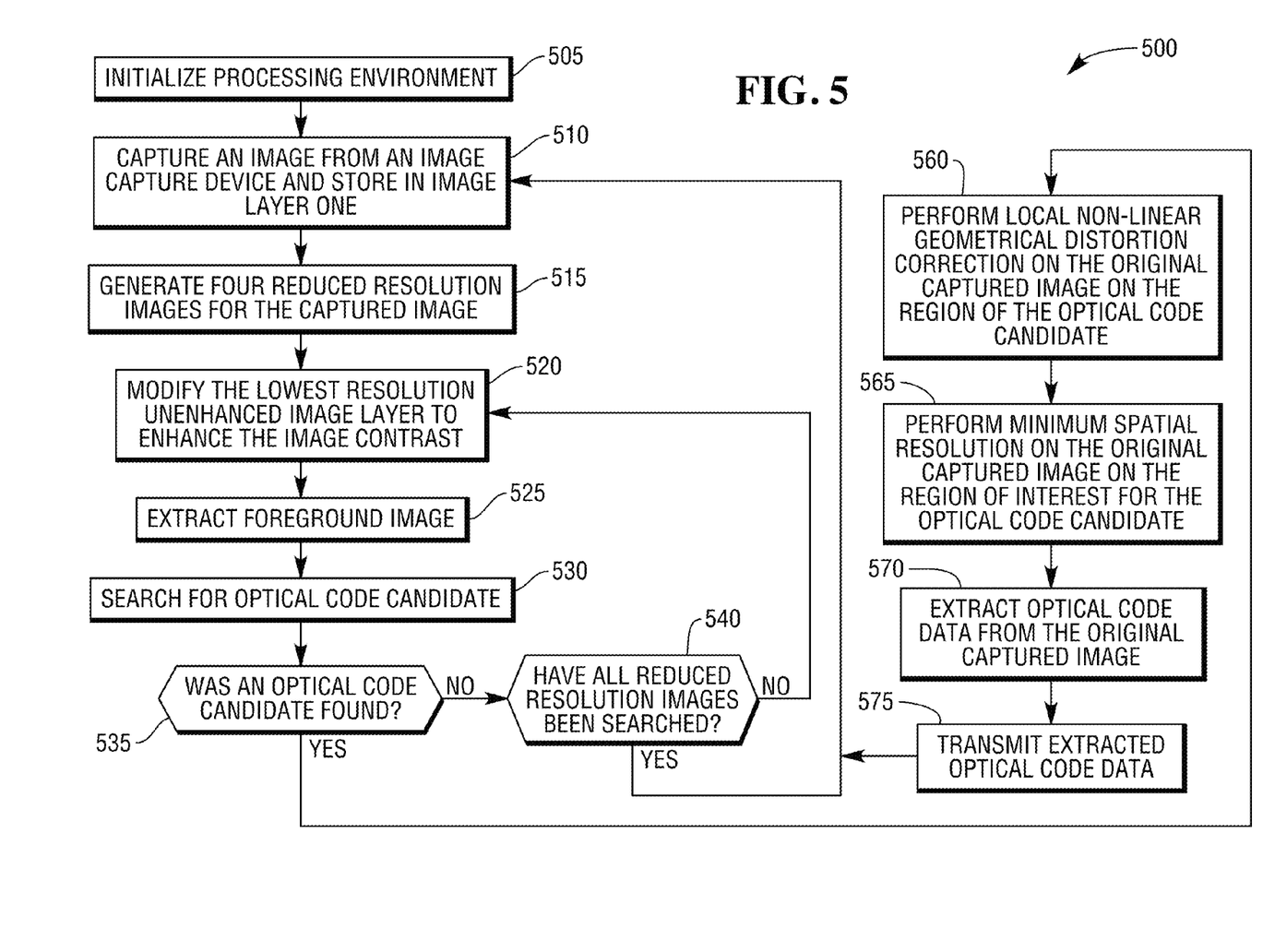
FIG. 5 is a high-level flow diagram illustrating a method of operating the optical code scanner.

With reference to FIG. 5, there is presented a high-level flow diagram illustrating a method 500 of operating the optical code scanner 100 to scan an optical code. The following method 500 describes one embodiment of the optical code scanner 100 and one method of operating the optical code scanner 100 to read the optical code 200. In this example, the optical code 200 is a two dimensional optical code that is based on the PDF417 format. This optical code format is widely used and is one of the more difficult optical code formats to read. While the method described below is designed to read the PDF417 format, it will also read other optical code formats including but not limited to one dimensional formats and other two dimensional formats. The method 500 is performed by the processor 310 in the optical code scanner 100. The method 500 is implemented by application software that is stored in the memory 315 and executed by the processor 310.

In embodiments where the processor 310 is implemented using multi-core processors, the method 500 can be duplicated and each processor core will implement a copy of the method 500 in parallel. Where multiple image capture devices are present, each image capture device is assigned to one of a plurality of device groups and a processor core is assigned to a device group to process images from the one or more image capture devices assigned to that device group.

In embodiments having a single processor 310 with a single processor core, the method 500 will be implemented to serially process images captured from each of the image capture devices present in the optical code scanner 100. One of the image capture devices may be designed as a primary device and images from this image capture device are processed first. If an optical code is not found, images from the one or more additional image capture devices are processed. Image processing will continue using images from each of the image capture devices until an optical code is read and then the process will begin again.

In step 505, the processor 310 starts execution of the application software that implements the method 500. The software causes the processor 310 to initialize the processing environment of the application software. This includes initializing data variables and allocating data storage space from the memory 315 for the five image layers 400 that will be used to store the original captured image and four lower resolution versions of the captured image.

In step 510, the processor 310 captures an image from the first image capture device 210 and stores the digital image data in the first image layer 405. The captured image is received from the area of the optical code scanner 100 where items are presented for scanning. In this embodiment, the image capture device 210 is a 1.2 megapixel device with a resolution of 1280 (columns)×960 (rows). Other embodiments may suitably use different resolution capture devices. Because this step is repeatedly executed to process new captured images, the processor 310 also initializes local variables that will be used to process a new receive capture image.

In step 515, the processor 310 sequentially generates four reduced resolution images from the original captured image stored in the first image layer 405. The resolution of each generated image is reduced by 4× from the prior image. The first reduced resolution image has a resolution of 640×480 and is stored in the second image layer 410. The second reduced resolution image has a resolution of 320×240 and is stored in the third image layer 415. The third reduced resolution image has a resolution of 160×120 and is stored in the forth image layer 420. The fourth reduced resolution image has a resolution of 80×60 and is stored in the fifth image layer 425.

In step 520, the processor 310 modifies the lowest resolution unenhanced image layer to enhance the image contrast. Each of the image layers 400 has a contrast status variable associated with it that is used to determine if the image layer has been modified to enhance the image contrast. Initially, all contrast status variables are set to false meaning the associated image layer has not been processed to enhance the image contrast. As each image layer is modified to enhance the image contrast, the associated contrast status variable is changed to true. Whenever this step is executed, the lowest resolution image layer that has not been contrast enhanced is processed to enhance the image contrast.

Enhancing the contrast of an image layer includes executing a contrast function on each pixel element of the lowest resolution unenhanced image layer. The contrast function is defined as:

$$C(x,y)=[fmax(x,y)-fmin(x,y)]/[fmax(x,y)+fmin(x,y)+e]$$

The fmax(x,y) function calculates the maximum pixel intensity within a small region around the x,y coordinates. The fmin(x,y) function calculates the minimum pixel intensity within the same small region around the x,y coordinates. The term "e" is small constant value used to prevent a divide by zero event but designed to have minimal influence on the generated value. The result of each C(x,y) function is stored in place of the original value located at pixel coordinate (x,y).

In step 525, the processor 310 extracts a foreground image from the image layer that step 520 just performed the contrast enhancement function on. This will be the highest resolution image layer where the contrast status variable is set to true. To extract the foreground image from the image layer, the processor 310 executes an intra-class/between-class variance function. The intra-class/between class variance function is different from and an improvement over a standard global thresholding method and a NiBlack local thresholding method.

The intra-class variance function performs a classification of an image and creates two groups based on the results of the classification. The intra-class variance $\sigma_i^2(t)$ represents the aggregation level for a class. It can be calculated by:

$$\sigma_i^2(t)=(q_1(t)*\sigma_1^2(t))+(q_2(t)*\sigma_2^2(t))$$

where:

$q_1(t)$, $q_2(t)$ are the probabilities of class 1 and class 2 respectively.

$\sigma_1^2(t)$, $\sigma_2^2(t)$ are the individual class variances of class 1 and class 2 respectively.

The between-class variance is used to measure the distance between two classes. The bigger the value for the between-class variance, the more distinguishable the two classes are. The two classes are used to identify the foreground of the image and background of the image. Between-class variance $\sigma_b^2(t)$ can be expressed by:

$$\sigma_b^2(t)=q_1(t)*q_2(t)*[\mu_1(t)-\mu_2(t)]^2;$$

where:

$q_1(t)$, $q_2(t)$: the probabilities of class 1 and class 2 respectively $\mu_1(t)$, $\mu_2(t)$: the class means of class 1 and class 2 respectively In practice, minimizing the intra-class variance is done by equivalently maximizing the between-class variance for a given candidate threshold t. A pixel having a between-class variance value above a predefined threshold t is determined to be part of the foreground otherwise it is part of the background. The processor 310 extracts or identifies all the pixels or portions of the image that are determined to be part of the foreground. The identified pixels or portion of the image are known as the optical code region of interest (ROI). The ROI has the highest probability of containing an optical code. It is the ROI that is further processed to identify an optical code. Processing only the ROI of the image reduces the amount of processing power required to recover the optical code.

In step 530, the processor 310 searches the ROI on the reduced resolution image layer for an optical code candidate. This step does not read or decode the optical code; it only performs a high level search to determine if an optical code is potentially present in the ROI.

In step 535, control passes to step 560 if an optical code candidate is found. Otherwise, control passes to step 540.

In step 540, the processor 310 determines if all the reduced resolution images have been processed to determine if an optical code candidate has been found. If not all the reduced resolution images have been processed, control passes back to step 520. If all the reduced resolution images have been processed and no optical code candidates have been found, control passes to step 510 where a new captured image is processed. This means that the processed image did not include an image of an optical code or any optical code in the image could not be identified as an optical code.

In step 560, the processor 310 performs a non-linear local geometrical distortion correction on the original captured image stored in the first image layer 405. The correction is performed on only a portion of the original captured image stored in the first image layer 405. The portion of the original captured image that is corrected corresponds to the ROI identified in the reduced resolution version of the image. The ROI has been determined to include an optical code candidate. It should be noted that there can be multiple ROIs in an image. This reduces the raw processing power needed to make the correction.

The correction process is a recursive function that uses multiple affine transformations to perform the correction. The function divides the ROI into multiple smaller regions. In this embodiment, the structures associated with the PDF417 format are used to determine the boundaries for the smaller regions. High-precision edge extraction and corner detection functions are used to identify elements within the smaller regions. The presence of outliers in each region is determined using a least squares technique. If outliers are found in a region, a recursive function is performed to correct for local geometrical distortion in the region. The recursive function includes estimating a required geometric correction to remove the outliers. Performing a local geometrical transformation to the region uses the estimated correction and determines if outliers still exist after the transformation. If outliers still exist, another estimated geometric correction is generated and the recursive function continues until no outliers are found.

The affine transformation function may suitably be expressed by:

$$X_i=a0+a1*U_i+a2*V_i$$

$$Y_i=b0+b1*U_i+b2*V_i$$

Where, $(X_i,Y_i)$ are the new transformed coordinates of $(U_i,V_i)$, i=1,2, . . . , n;

n—the total number of points;

(a0, a1, a2, b0, b1, b2) is transformation parameters.

In step 565, the processor 310 performs a minimum spatial resolution function on the original captured image in the region of interest for the optical code candidate. The minimum spatial resolution function confirms that an optical code is present in the region of interest and extracts pattern features that are used later to read the optical code. The function uses first and second derivative edge detection methods along with recursive decoding methods to extract pattern features and reduce image noise. The combined methods successfully read optical codes with 5 mil wide elements at a spatial resolution as low as 1.23 pixels per optical code element.

In step 570, the processor 310 reads or extracts the optical code data from the optical code located in the region of interest of the first image layer 405. The first image layer 405 is the original captured image at the highest resolution. This method uses the lower resolution images to identify the location of the optical code but uses the high resolution image to decode the optical code.

In step 575, the processor 310 transmits the extracted optical code data to an external computer over the external network 360. In this embodiment, the optical code data is transmitted to the point of sale terminal 365. After transmission of the optical code data, control then passes back to step 510 where the process of receiving an image and decoding an optical code within the image is repeated.

Although the present invention has been described with particular reference to certain preferred embodiments thereof, variations and modifications of the present invention can be effected within the spirit and scope of the following claims.

What is claimed is:

1. A method of operating an optical code, the method comprising:
capturing an image from the item scanning area of the optical code scanner;
generating a sequence of reduced resolution images from the captured image wherein each successive generated image has a lower resolution than the prior image;
starting with a generated image with a lowest resolution and continuing through the sequence with a generated image with a next lowest resolution until an optical code candidate is determined to be included in a respective generated image:
enhancing the contrast of the generated image with a lowest resolution, not previously enhanced, to improve the quality of the image;
identifying a region of interest in the enhanced generated image with the highest resolution;
determining whether the region of interest includes the optical code candidate;
in response to determining that the region of interest includes the optical code candidate, modifying a portion of the captured image that corresponds to the region of interest to correct for geometrical distortion; and
recovering optical code data from the optical code candidate located in the modified portion of the captured image.

2. The method of claim 1, wherein generating a sequence of reduced resolution images includes generating successive images that each have a 4× reduction in image resolution from the prior image.

3. The method of claim 2, wherein four reduced resolution images are generated.

4. The method of claim 1, wherein to correct for geometrical distortion further comprises correcting for local non-linear geometrical distortion of the optical code candidate.

5. The method of claim 1, further comprising:
extracting a foreground image from the enhanced generated image with the highest resolution using intra-class variance;
and using the extracted foreground image to identify the optical code candidate.

6. The method of claim 1, further comprising:
performing a minimum spatial resolution function on the region of interest; and
wherein recovering optical code data includes using data generated by a minimum spatial resolution function.

7. The method of claim 1, further comprising:
transmitting the recovered optical code data on an external network.

8. An optical code scanner comprising:
an image capture device arranged to receive images from an item scanning area of the optical code scanner;
a communications device connected to an external network;
a memory including software; and
a processor in communication with the image capture device, the communications device and the memory and where the software when executed by the processor causes the processor to perform the following steps:
capture an image from the item scanning area of the optical code scanner;
generate a sequence of reduced resolution images from the captured image wherein each successive generated image has a lower resolution than the prior image;
until a region of interest is identified, enhance the contrast of the then lowest resolution generated image from the sequence of reduced resolution images not previously enhanced to improve the quality of the image;
identify, from the enhanced generated images from the sequence of reduced resolution images, a region of interest in the enhanced generated image with the highest resolution wherein the region of interest includes an optical code candidate;
in response to identifying the region of interest, modify a portion of the captured image that corresponds to the identified region of interest to correct for geometrical distortion; and
recover optical code data from the optical code candidate located in the modified portion of the captured image.

9. The method of claim 8, wherein generating a sequence of reduced resolution images includes generating successive images that each have a 4× reduction in image resolution from the prior image.

10. The method of claim 9, wherein four reduced resolution images are generated.

11. The method of claim 8, wherein to correct for geometrical distortion further comprises correcting for local non-linear geometrical distortion of the optical code candidate.

12. The method of claim 8, further comprising:
extracting a foreground image from the enhanced generated image with the highest resolution using intra-class variance;
and wherein identifying the region of interest includes using the extracted foreground image to identify the optical code candidate.

13. The method of claim 8, further comprising:
performing a minimum spatial resolution function on the region of interest; and
wherein recovering optical code data includes using data generated by the minimum spatial resolution function.

14. A method of operating an optical code scanner implemented by a digital processor within the optical code scanner, the method comprising:
capturing an image from the item scanning area of the optical code scanner;
generating a sequence of reduced resolution images from the captured image wherein each successive generated image has a lower resolution than the prior image;
enhancing the contrast of the lowest resolution generated image not previously enhanced to improve the quality of the image;
examining the highest resolution generated image that has been enhanced to determine if a region of interest exists wherein the region of interest includes an optical code candidate and when a region of interest is determined not to exist, repeating the enhancing and examining steps until a region of interest is found or all enhanced generated images have been examined and when a region of interest is determined to exist, performing the modifying and recovering steps;

determining when no region of interest has been found to exist and all enhanced generated images have been examined for a region of interest and then repeating the capturing, the generating, the enhancing and examining steps;

modifying a portion of the captured image that corresponds to the identified region of interest to correct for geometrical distortion; and recovering optical code data from the optical code candidate located in the modified portion of the captured image.

15. The method of claim 14, wherein generating a sequence of reduced resolution images includes generating successive images that each have a 4× reduction in image resolution from the prior image.

16. The method of claim 15, wherein four reduced resolution images are generated.

17. The method of claim 14, wherein to correct for geometrical distortion further comprises correcting for local non-linear geometrical distortion of the optical code candidate.

18. The method of claim 14, further comprising:

extracting a foreground image from the enhanced generated image with the highest resolution using intra-class/between-class variance;

and wherein determining the existence of the region of interest includes using the extracted foreground image to identify the optical code candidate.

19. The method of claim 14, further comprising:

performing a minimum spatial resolution function on the region of interest; and wherein recovering optical code data further includes using data generated by the minimum spatial resolution function.

* * * * *